US012372394B2

(12) United States Patent
Lee et al.

(10) Patent No.: US 12,372,394 B2
(45) Date of Patent: Jul. 29, 2025

(54) WATER LEVEL DETECTION DEVICE AND METHOD FOR CONTROLLING WATER LEVEL DETECTION DEVICE

(71) Applicant: Samsung Electronics Co., Ltd., Suwon-si (KR)

(72) Inventors: Sangyong Lee, Suwon-si (KR); Jueon Kim, Suwon-si (KR); Jihyung Ha, Suwon-si (KR); Kwangryul Kim, Suwon-si (KR); Kwangyoun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 18/176,338

(22) Filed: Feb. 28, 2023

(65) Prior Publication Data

US 2023/0204402 A1 Jun. 29, 2023

Related U.S. Application Data

(63) Continuation of application No. PCT/KR2021/011884, filed on Sep. 2, 2021.

(30) Foreign Application Priority Data

Sep. 22, 2020 (KR) .......... 10-2020-0122254

(51) Int. Cl.
G01F 23/263 (2022.01)
(52) U.S. Cl.
CPC .................. G01F 23/268 (2013.01)
(58) Field of Classification Search
CPC .............................. G01F 23/26–268
See application file for complete search history.

(56) References Cited

U.S. PATENT DOCUMENTS 5,142,909 A * 9/1992 Baughman ............ G01F 23/266
73/304 C
9,602,170 B2 3/2017 Kamon et al.
(Continued)

FOREIGN PATENT DOCUMENTS

JP 2005-030971 A 2/2005
JP 4936814 B2 5/2012
(Continued)

OTHER PUBLICATIONS

International Search Report dated Dec. 8, 2021 in connection with International Patent Application No. PCT/KR2021/011884, 2 pages.

Primary Examiner — Justin N Olamit

(57) ABSTRACT

A water level detection device capable of preventing water from overflowing due to a bumping phenomenon or excessive number of cooking objects and capable of detecting a water level inside a cookware, comprises: a first probe; a second probe; a lean angle sensor configured to detect a lean angle of the first probe and the second probe; a capacitance sensor configured to detect capacitance between the first probe and the second probe; and a processor configured to calculate a danger level of the cookware based on an intensity of a current flowing from the first probe to the second probe and the lean angle of the first probe and the second probe; and configured to determine whether the water level inside the cookware reaches the danger level based on the capacitance between the first probe and the second probe.

20 Claims, 15 Drawing Sheets

(56) References Cited

U.S. PATENT DOCUMENTS

| | | |
|---|---|---|
| 10,555,379 B2 | 2/2020 | Kim et al. |
| 11,326,924 B2 | 5/2022 | Rhee |
| 2011/0102000 A1* | 5/2011 | Klett .................. G01F 23/263 |
| | | 427/58 |
| 2017/0367151 A1 | 12/2017 | Rafii et al. |
| 2019/0128723 A1* | 5/2019 | Ishida .................. G01G 17/04 |
| 2021/0209465 A1 | 7/2021 | Maeng |

FOREIGN PATENT DOCUMENTS

| | | |
|---|---|---|
| JP | 5153835 B2 | 2/2013 |
| JP | 2014-126375 A | 7/2014 |
| JP | 5645697 B2 | 12/2014 |
| JP | 2016-197609 A | 11/2016 |
| JP | 6109207 B2 | 4/2017 |
| JP | 2017-224171 A | 12/2017 |
| JP | 2018-142558 A | 9/2018 |
| JP | 2020-004619 A | 1/2020 |
| JP | 2020-060432 A | 4/2020 |
| JP | 2020-091110 A | 6/2020 |
| KR | 10-2011-0040429 A | 4/2011 |
| KR | 10-2011-0128378 A | 11/2011 |
| KR | 10-2014-0091387 A | 7/2014 |
| KR | 10-2017-0062000 A | 6/2017 |
| KR | 10-2017-0111364 A | 10/2017 |
| KR | 10-1849099 B1 | 4/2018 |
| KR | 10-2018-0092184 A | 8/2018 |
| KR | 10-1892842 B1 | 8/2018 |
| KR | 10-2057192 B1 | 1/2020 |
| KR | 10-2021-0088315 A | 7/2021 |

* cited by examiner

WATER LEVEL DETECTION DEVICE AND METHOD FOR CONTROLLING WATER LEVEL DETECTION DEVICE

CROSS-REFERENCE TO RELATED APPLICATIONS

This application is a Bypass Continuation of International Patent Application No. PCT/KR2021/011884 filed on Sep. 2, 2021, which is based on and claims priority to Korean Patent Application No. 10-2020-0122254 filed on Sep. 22, 2020, the disclosures of which are herein incorporated by reference in their entirety.

BACKGROUND

1. Field

The present disclosure relates to a water level detection device capable of preventing a bumping phenomenon that may occur during use of a cooking apparatus, and a control method of the water level detection device.

2. Description of Related Art

A cooking apparatus is a device that cooks a cooking object by heating a cookware or by directly heating the cooking object, and performs various functions related to cooking such as heating, defrosting, drying, and sterilization of a cooking object.

The cooking apparatus includes an oven that directly transfers heat to a cooking object through a heat source such as a heater or the like, or heats the inside of a cooking chamber to cook the cooking object, a microwave oven uses a magnetron as a heat source to cook a cooking object by using frictional heat between molecules generated by disturbing the arrangement of molecules, a gas stove that heats a cookware using firepower generated by using gas as fuel, a radiant cooktop that heats a cookware by using heat generated by using metal coils, and an induction cooktop that heats a metallic cookware by using magnetic fields.

When heating the cookware using the cooking apparatus or directly heating a cooking object inside the cookware, water inside the cookware may overflow due to the bumping phenomenon, and accordingly, a user must keep an eye on the cookware.

The present disclosure is directed to providing a water level detection device capable of calculating a height of a cookware to determine a danger level inside the cookware and capable of preventing a water level inside the cookware from exceeding the danger level, and a control method of the water level detection device.

SUMMARY

One aspect of the present disclosure provides a water level detection device configured to detect a water level inside a cookware, the water level detection device including a first probe, a second probe, a lean angle sensor configured to detect a lean angle of the first probe and the second probe, a capacitance sensor configured to detect capacitance between the first probe and the second probe, and a processor configured to calculate a danger level of the cookware based on an intensity of a current flowing from the first probe to the second probe and the lean angle of the first probe and the second probe, and configured to determine whether the water level inside the cookware reaches the danger level based on the capacitance between the first probe and the second probe.

The current flowing from the first probe to the second probe may be a current in a closed circuit formed by a first contact point between the first probe and the cookware, and a second contact point between the second probe and the cookware. The processor may be configured to determine a position of the first contact point and the second contact point based on a current value flowing in the closed-circuit, configured to calculate a height of the cookware based on the position of the first contact point and the second contact point, and the lean angle of the first probe and the second probe, and configured to calculate the danger level of the cookware based on the height of the cookware.

The water level detection device may further include a temperature sensor provided on the first probe or the second probe and configured to measure a temperature value. The processor may be configured to determine whether the water level inside the cookware reaches the danger level, in response to measuring a temperature value greater than or equal to a predetermined value.

The water level detection device may further include a speaker, and the processor may be configured to control the speaker to output a warning sound in response to the water level inside the cookware reaching the danger level.

The water level detection device may further include a communication circuitry configured to communicate with a home appliance or a mobile terminal device. The processor may be configured to control the communication circuitry to transmit warning data to the home appliance or the mobile terminal device in response to the water level inside the cookware reaching the danger level.

The processor may be configured to control the communication circuitry to transmit information on the water level inside the cookware and information on a temperature value obtained from the temperature sensor to the home appliance or the mobile terminal device.

The water level detection device may further include a communication circuitry configured to communicate with a cooking apparatus configured to heat the cookware. The processor may be configured to control the communication circuitry to transmit a command for reducing a heat intensity of the cooking apparatus to the cooking apparatus in response to the water level inside the cookware reaching the danger level.

The processor may be configured to control the communication circuitry to transmit, to the cooking apparatus, a command for stopping a heating operation of the cooking apparatus in response to an amount of change in the water level inside the cookware per unit time being constant and in response to the water level inside the cookware being less than or equal to a predetermined water level.

The water level detection device may further include a communication circuitry including a first communication module configured to communicate with a mobile terminal device and a second communication module configured to communicate with a cooking apparatus configured to heat the cookware, and a temperature sensor provided on the first probe or the second probe. In response to receiving a temperature control command from the mobile terminal device through the first communication module, the processor may be configured to control the second communication module to transmit a command for adjusting a heat intensity of the cooking apparatus based on a temperature value measured by the temperature sensor and the temperature control command.

The water level detection device may further include a conductive member configured to move in a direction parallel to the first probe and the second probe, and provided to electrically connect the first probe and the second probe.

Another aspect of the present disclosure provides a control method of a water level detection device including a first probe and a second probe and configured to detect a water level inside a cookware, the control method including calculating a danger level of the cookware based on an intensity of a current flowing from the first probe to the second probe and a lean angle of the first probe and the second probe, and determining whether the water level inside the cookware reaches the danger level based on capacitance between the first probe and the second probe.

The current flowing from the first probe to the second probe may be a current in a closed circuit formed by a first contact point between the first probe and the cookware, and a second contact point between the second probe and the cookware. The calculating of the danger level of the cookware may include determining a position of the first contact point and the second contact point based on a current value flowing in the closed-circuit, calculating a height of the cookware based on the position of the first contact point and the second contact point and the lean angle of the first probe and the second probe, and calculating the danger level of the cookware based on the height of the cookware.

The determination of whether the water level inside the cookware reaches the danger level may include determining whether the water level inside the cookware reaches the danger level, in response to measuring a temperature value, which is measured by a temperature sensor arranged in the first probe or the second probe, greater than or equal to a predetermined value.

The control method may further include controlling a speaker to output a warning sound in response to the water level inside the cookware reaching the danger level.

The control method may further include transmitting warning data to a home appliance or a mobile terminal device in response to the water level inside the cookware reaching the danger level.

The control method may further include transmitting information on the water level inside the cookware and information on a temperature value, which is obtained from a temperature sensor arranged in the first probe or the second probe, to a home appliance or a mobile terminal device.

The control method may further include transmitting a command for reducing a heat intensity of the cooking apparatus to the cooking apparatus in response to the water level inside the cookware reaching the danger level.

The control method may further include transmitting, to a cooking apparatus, a command for stopping a heating operation of the cooking apparatus in response to an amount of change in the water level inside the cookware per unit time being constant, and in response to the water level inside the cookware being less than or equal to a predetermined water level.

The control method may further include receiving a temperature control command from a mobile terminal device through a first communication module of the water level detection device, and transmitting a command for adjusting a heat intensity of a cooking apparatus, which is configured to heat the cookware, based on a temperature value, which is measured by a temperature sensor arranged on the first probe or the second probe, and the temperature control command through a second communication module of the water level detection device.

The water level detection device may further include a conductive member configured to move in a direction parallel to the first probe and the second probe, and provided to electrically connect the first probe and the second probe. The calculating of the danger level of the cookware may include calculating the danger level of the cookware based on the intensity of the current flowing from the first probe to the second probe and the lean angle of the first probe and the second probe.

A water level detection device and a control method of the water level detection device may prevent water from overflowing due to a bumping phenomenon or excessive number of cooking objects.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
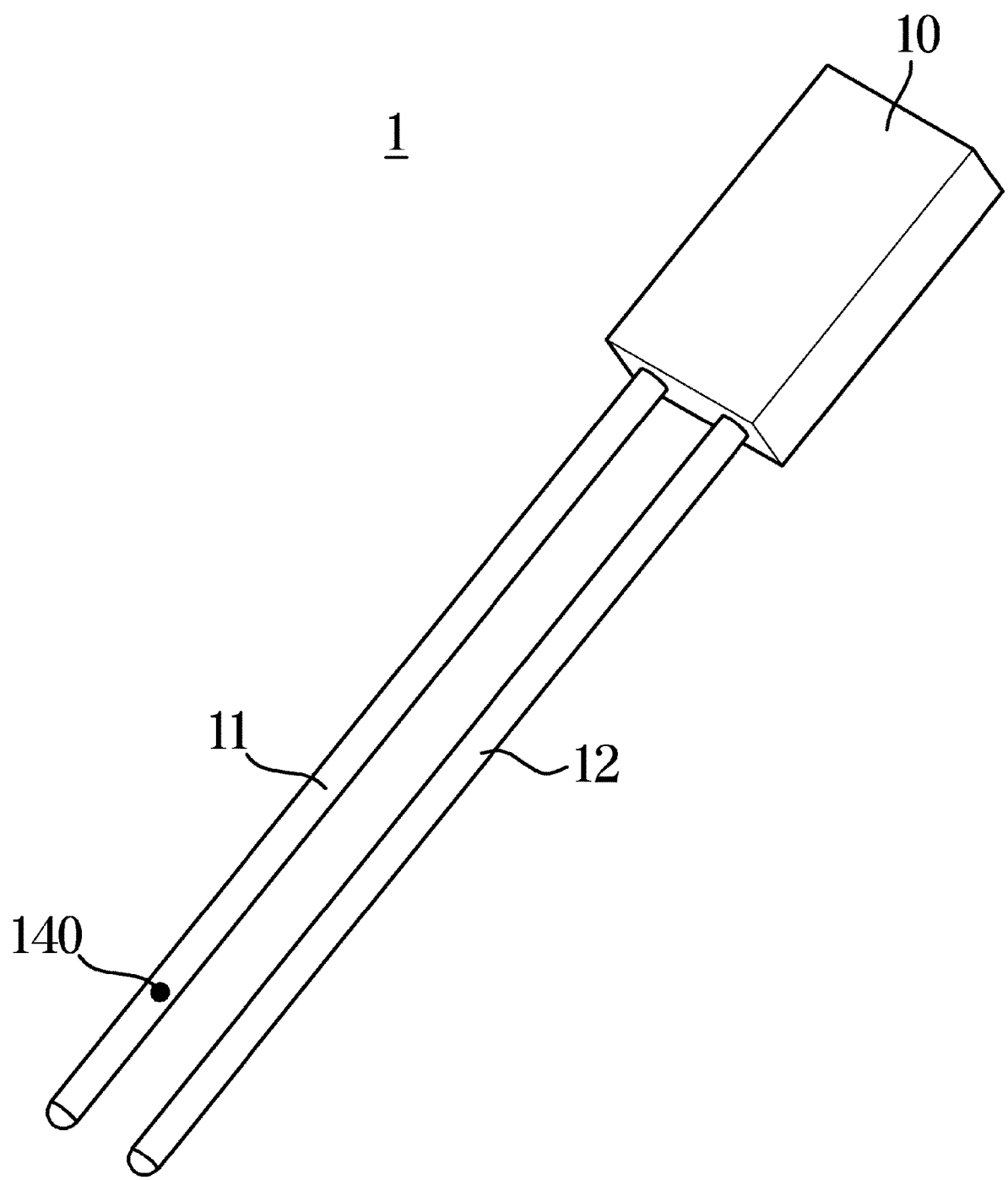
FIG. 1 illustrates a water level detection device according to one embodiment.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure, and may be modified in various different ways at the time of filing of the present application to replace the embodiments and drawings of the disclosure.

It will be understood that when an element is referred to as being "connected" another element, it can be directly or indirectly connected to the other element, wherein the indirect connection includes "connection via a wireless communication network".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor An identification code is used for the convenience of the description but is not intended to illustrate the order of each step. The each step may be implemented in the order different from the illustrated order unless the context clearly indicates otherwise.

In the present disclosure, "cookware" may refer to a general term for all utensils that is capable of containing water, such as pots.

Hereinafter exemplary embodiments of the present disclosure will be described in detail with reference to the accompanying drawings.

Figure 2:
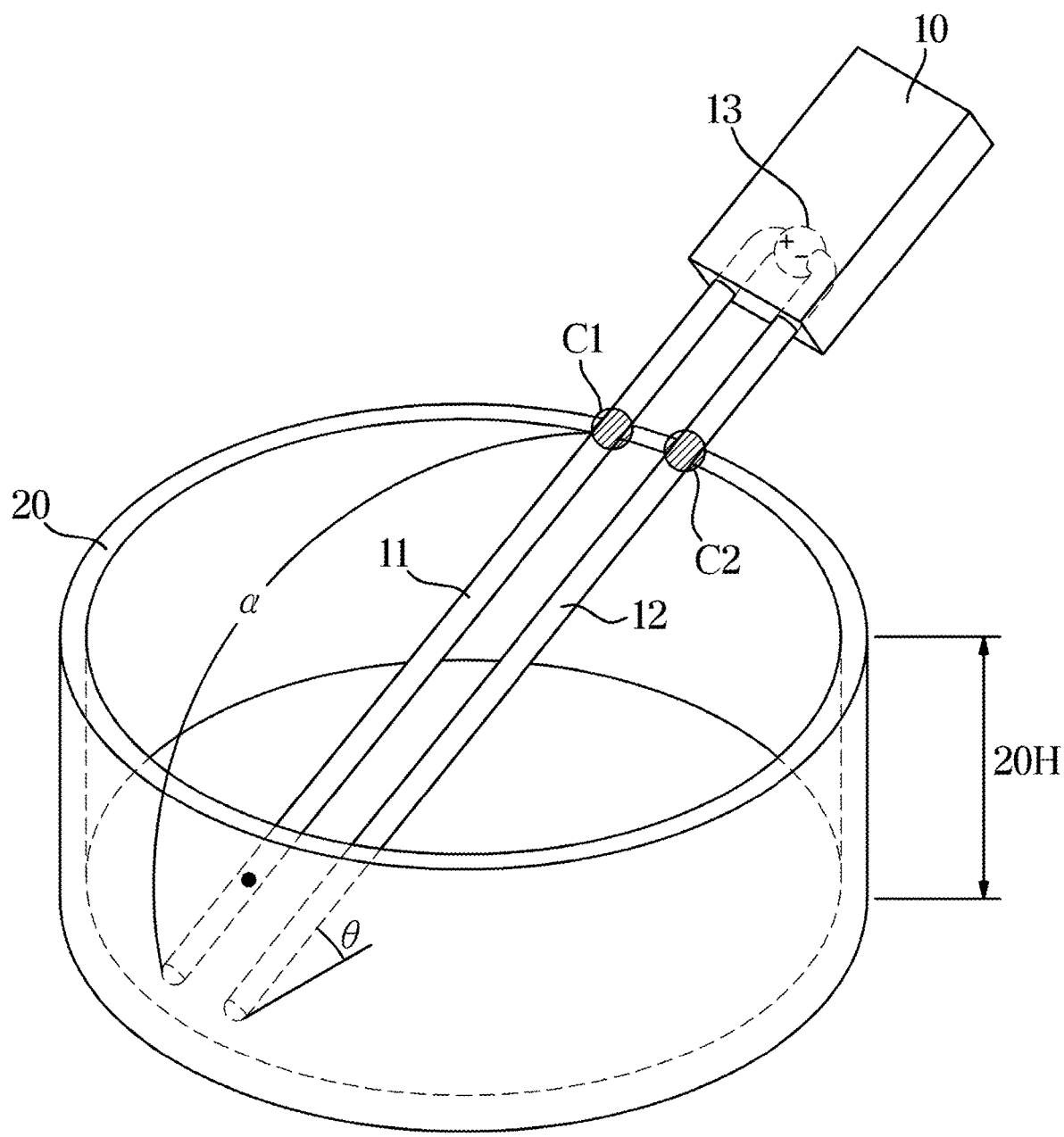
FIG. 2 illustrates a state in which the water level detection device according to one embodiment is arranged in a metallic cookware.
Figure 3:
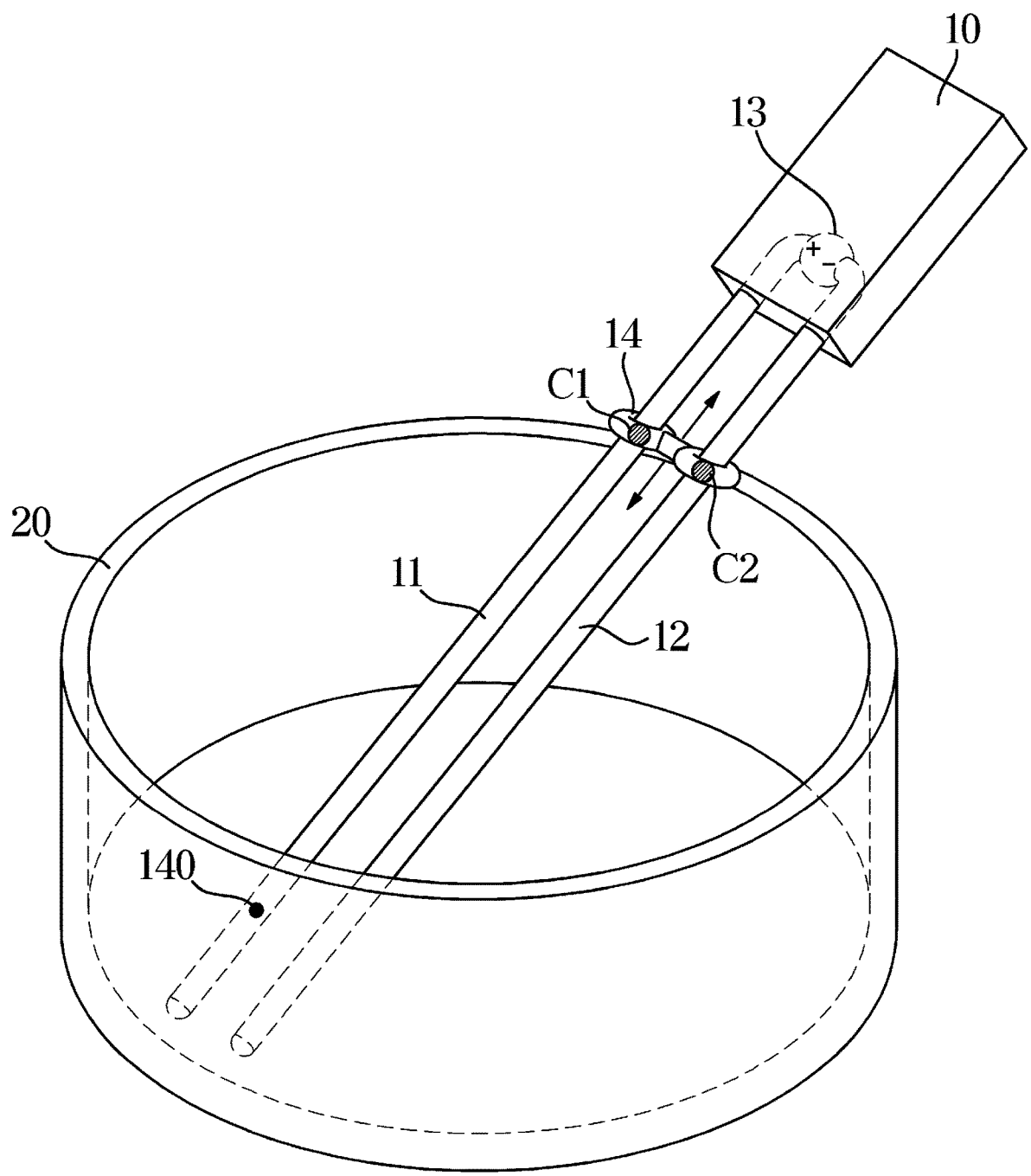
FIG. 3 illustrates a state in which the water level detection device according to one embodiment is arranged in a non-metallic cookware.
Figure 4:
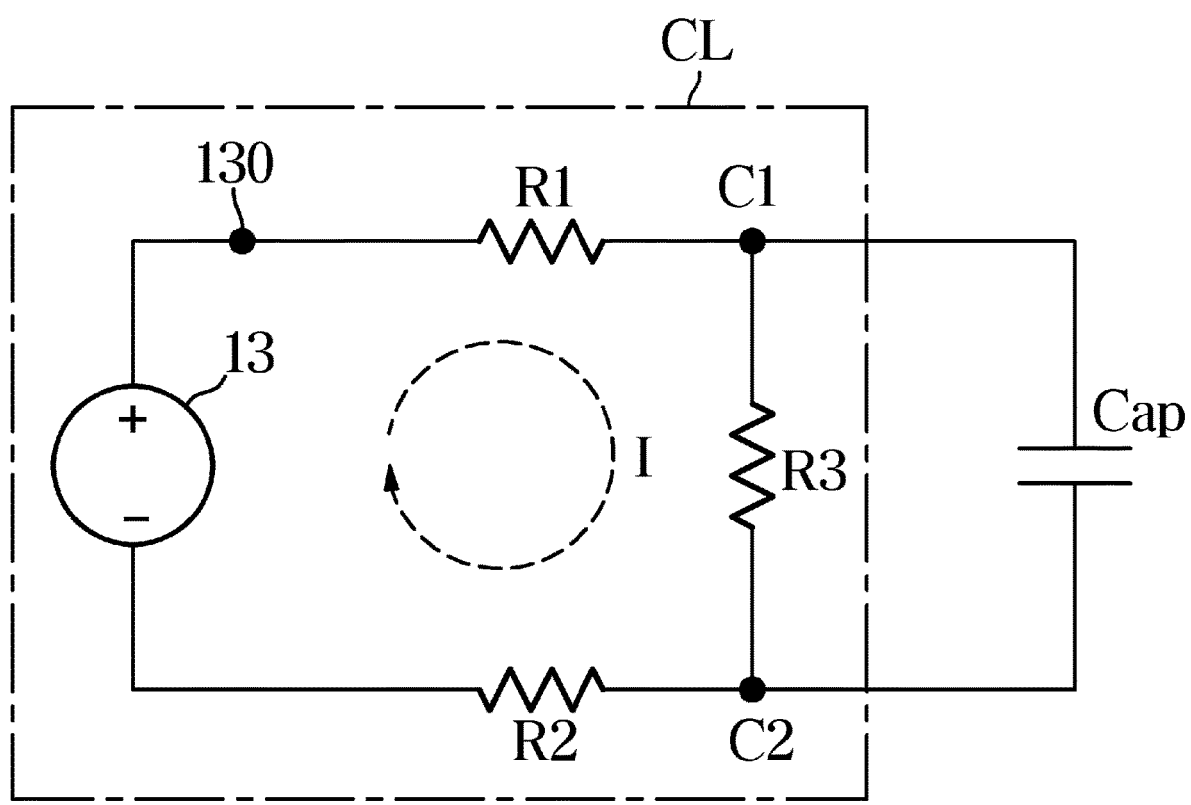
FIG. 4 illustrates a closed-circuit formed in the water level detection device according to one embodiment.
Figure 5:
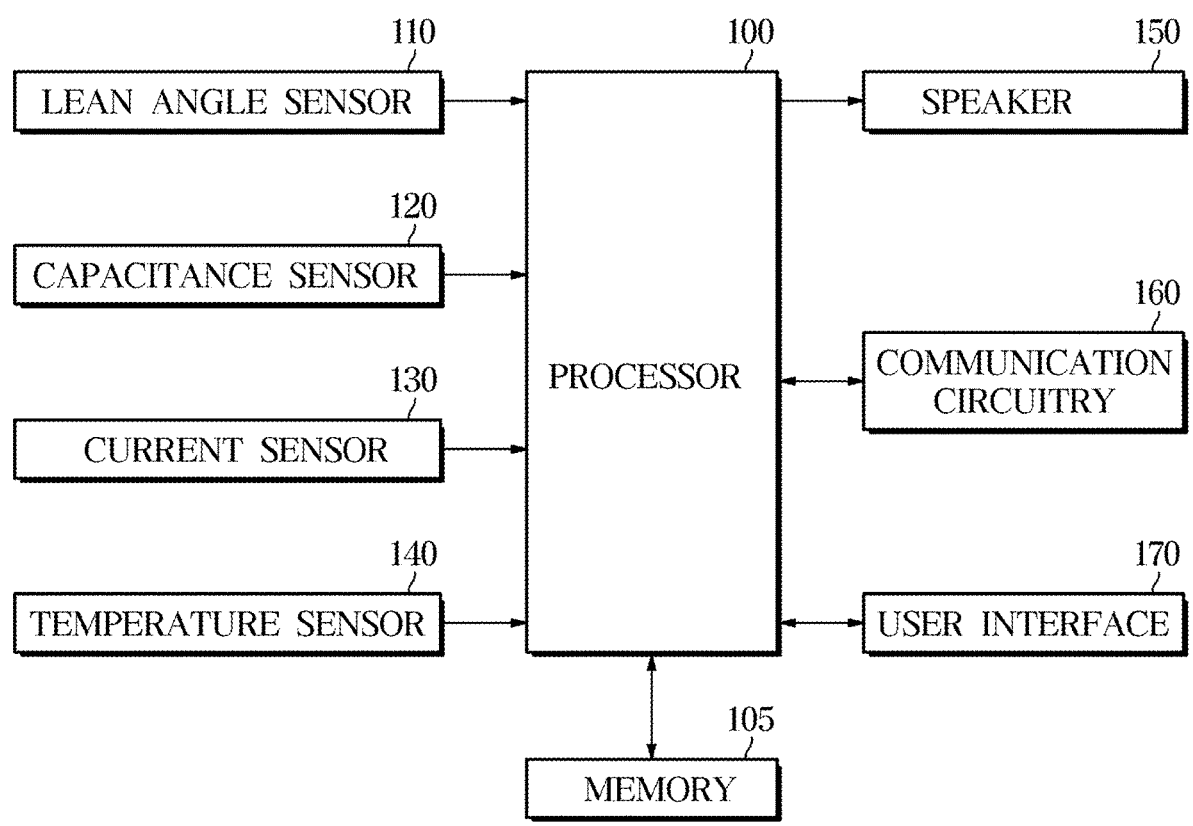
FIG. 5 illustrates a control block diagram of the water level detection device according to one embodiment.

FIG. 1 illustrates a water level detection device according to one embodiment, FIG. 2 illustrates a state in which the water level detection device according to one embodiment is arranged in a metallic cookware, FIG. 3 illustrates a state in which the water level detection device according to one embodiment is arranged in a non-metallic cookware, FIG. 4 illustrates a closed-circuit formed in the water level detection device according to one embodiment, and FIG. 5 illustrates a control block diagram of the water level detection device according to one embodiment.

Referring to FIG. 1, a water level detection device 1 may include a body 10, a first probe 11 connected to one surface of the body 10, a second probe 12 connected to one surface of the body 10 in parallel to the first probe 11, and a temperature sensor 140 arranged on the first probe 11.

The body 10 according to one embodiment may include at least one memory 105 in which a program for performing at least one function or operation of the water level detection device 1 is stored, and at least one processor 100 configured to execute the program stored in the memory 105.

In addition, the body 10 may include sensors 110, 120, and 130 configured to obtain various information and/or data for performing at least one function or operation of the water level detection device 1. However, sensors configured to obtain various information and/or data for performing at least one function or operation of the water level detection device 1 may be provided in the first probe 11 and/or the second probe 12.

The first probe 11 and the second probe 12 may be formed of a conductive material having a resistance component, and the first probe 11 and the second probe 12 may be parallel to each other.

The temperature sensor 140 configured to obtain temperature information of a cooking object may be attached to the first probe 11 and/or the second probe 12, and it is appropriate that the temperature sensor 140 is arranged on a vicinity of a tip of the first probe 11 and/or the second probe 12. In this case, the vicinity of the tip in which the temperature sensor 140 is provided may mean one end in a direction opposite to the body 10.

Referring to FIG. 2, the water level detection device 1 may be mounted on a cookware 20 to detect a water level inside the cookware 20. Particularly, a user can place the first probe 11 and the second probe 12 to the inside the cookware 20, and place a part of the first probe 11 and the second probe 12 to an upper surface of the cookware 20, thereby mounting the water level detection device 1 to the cookware 20.

At this time, the first probe 11 and the second probe 12 may be mounted on the cookware 20 in an inclined state at a predetermined angle according to the size, and height of the cookware 20.

When the water level detection device 1 is mounted on the cookware 20, a first contact point C1 in which the first probe 11 and the cookware 20 come into contact with each other and a second contact point C2 in which the second probe 12 and the cookware 20 come into contact with each other may be formed. The first contact point C1 and the second contact point C2 may be electrically connected by the metallic cookware 20.

In addition, the water level detection device 1 may include a power supply 13 connected to the first probe 11 and the second probe 12. The power supply 13 may form a potential difference between the first probe 11 and the second probe 12, and the at least one processor 100 may determine a position of the first contact point C1 and/or a position of the second contact point C2 based on a current value flowing through the first probe 11 and/or the second probe 12.

Particularly, when the cookware 20 is the metallic cookware 20, a closed-circuit CL may be formed inside the water level detection device 1 through the first contact point C1 and the second contact point C2. Accordingly, a current may flow through the first probe 11 and the second probe 12.

As will be described later, the at least one processor 100 may calculate a height 20H of the cookware 20 by calculating a distance between the first contact point C1 and the tip of the first probe 11 based on the position of the first contact point C1 and by calculating a distance between the second contact point C2 and the tip of the second probe 12 based on the position of the second contact point C2.

When the cookware 20 is the metallic cookware 20, a contact point (hereinafter referred to as "third contact point") between the first probe 11 and a bottom of the cookware 20 and a contact point (hereinafter referred to as "fourth contact point") between the second probe 12 and the bottom of the cookware 20 may be formed. However, a closed-circuit formed by the third contact point and the fourth contact point has a greater resistance component than the closed-circuit CL formed by the first contact point C1 and the second contact point C2, and thus the closed-circuit formed by the third contact point and the fourth contact point may be neglected.

However, in order to prevent generation of the third and fourth contact points, the tip of the first probe 11 and the second probe 12 may be coated with a non-metallic material.

Referring to FIG. 3, the water level detection device 1 may further include a conductive member 14 electrically connecting the first probe 11 and the second probe 12.

The conductive member 14 may be configured to move in a direction parallel to the first probe 11 and the second probe 12. A user can insert the conductive member 14 to the first probe 11 and the second probe 12 and then move the conductive member 14 to a vicinity of a location in which cookware 20 and the first probe 11 and the second probe 12 come into contact.

The conductive member 14 may be manufactured in a ring shape, but is not limited thereto. Alternatively, the conductive member 14 may be manufactured in any shape capable of electrically connecting the first probe 11 and the second probe 12 to each other. Further, the conductive member 14 may be manufactured based on a distance between the first probe 11 and the second probe 12.

Accordingly, when the water level detection device 1 is mounted on the cookware 20, the first contact point C1, in which the first probe 11 and the cookware 20 come into contact, and the second contact point C2, in which the second probe 12 and the cookware 20 come into contact, may be formed. The first contact point C1 and the second contact point C2 may be electrically connected by the conductive member 14.

Referring to FIG. 4, the closed-circuit CL may be formed in response to electrical connection between the first probe 11 and the second probe 12.

That is, when the water level detection device 1 is mounted on the cookware 20, the first contact point C1 and the second contact point C2 may be formed, and thus the closed-circuit CL may be formed by the first contact point C1 and the second contact point C2.

A resistance value of a first resistance element R1 in the closed-circuit CL may be determined by a distance from the power supply 13 to the first contact point C1, and a resistance value of a second resistance element R2 may be determined by a distance from the power supply 13 to the second contact point C2.

Particularly, the resistance value of the first resistance element R1 may be determined based on the distance from the power source 13 to the first contact point C1, a resistivity of the first probe 11, and an area of the first probe 11. The resistance value of the second resistance element R2 may be determined based on the distance from the power source 13 to the second contact point C2, a resistivity of the second probe 12, and an area of the second probe 12.

In this case, the resistivity and area of the first contact point C1 and the resistivity and area of the second contact point C2 are the same. The distance from the power source 13 to the first contact point C1 and the distance from the power source 13 to the second contact point C2 are the same. Accordingly, the resistance value of the first resistance element R1 and the resistance value of the second resistance element R2 may be the same.

When the water level detection device 1 is arranged on the metallic cookware 20, a third resistance element R3 between the first contact point C1 and the second contact point C2 may be determined based on the resistivity of the metallic cookware 20 and the distance between the first probe 11 and the second probe 12.

When the first contact point C1 and the second contact point C2 are connected by the conductive member 14 as the water level detection device 1 is arranged on the non-metallic cookware 20, the third resistance element R3 may be determined based on the resistivity of the conductive member 14 and the distance between the first probe 11 and the second probe 12.

For this, the memory 105 may store the resistivity value of the conductive member 14, or store an average resistivity value of the metallic cookware 20, or store an intensity of the closed-current CL current according to the position of the first contact point C1 and the second contact point C2.

The water level detection device 1 may further include a current sensor 130 configured to measure the intensity of the closed-circuit current I flowing in the closed-circuit CL formed by the first contact point C1 and the second contact point C2. The water level detection device 1 may determine a position of the first contact point C1 and the second contact point C2 based on the intensity of the closed-circuit current I.

As will be described later, a capacitor (Cap) component between the first probe 11 and the second probe 12 may be generated according to the first contact point C1 and the second contact point C2.

Referring to FIG. 5, the water level detection device 1 according to one embodiment may include a lean angle sensor 110 configured to detect a lean angle of the first probe 11 and/or the second probe 12, a capacitance sensor 120 configured to detect capacitance of the capacitor (Cap) component between the first probe 11 and the second probe 12, a current sensor 130 configured to measure the closed-circuit current I, the temperature sensor 140 provided on the first probe 11 and/or the second probe 12 to measure a temperature of a cooking object, the at least one memory 105 configured to store a program for performing at least one function or operation of the water level detection device 1, the at least one processor 100 configured to execute the program stored in the memory 105, a speaker 150 configured to output a warning sound, a communication circuitry 160 configured to communicate with various communication targets, and a user interface 170 configured to receive an input from a user and provided to display various information.

The lean angle sensor 110 may mean any sensor configured to measure the lean angle of the first probe 11 and/or the second probe 12. For example, the lean angle sensor 110 may include at least one of a gyro sensor, an acceleration sensor, a geomagnetic sensor, and a capacitive angle sensor to determine an angle at which the first probe 11 and/or the second probe 12 is tilted.

At this time, the lean angle of the first probe 11 may mean an angle formed by the first contact point C1, a contact point between the first probe 11 and the bottom surface of the cookware 20, and a contact point between a virtual line vertically extending from the first contact point C1 and the cookware 20.

The capacitance sensor 120 may refer to any sensor configured to detect capacitance and/or capacitance variation between the first probe 11 and the second probe 12. For example, the capacitance sensor 120 may include a capacitive level sensor 120 configured to use a change in capacitance between the first probe 11 and the second probe 12 according to a level of the dielectric fluid between the two probes.

Because both the first probe 11 and the second probe 12 are formed of a conductive material, a capacitor component may be generated between the first probe 11 and the second probe 12, and the capacitance of the capacitor component may be changed according to the type of dielectric between the first probe 11 and the second probe 12.

For example, the permittivity of air and water are different, and the capacitance between the first probe 11 and the second probe 12 may be changed depending on how deeply the first probe 11 and the second probe 12 are immersed in water.

Accordingly, the processor 100 may calculate the water level inside the cookware 20 based on the capacitance between the first probe 11 and the second probe 12 obtained from the capacitance sensor 120.

The current sensor 130 may measure the intensity of the current flowing from the first probe 11 to the second probe 12. As described above, the current flowing from the first probe 11 to the second probe 12 may mean the current I of the closed-circuit CL formed by the first contact point C1 between the first probe 11 and the cookware 20 and by the second contact point C2 between the second probe 12 and the cookware 20.

The current sensor 130 may mean any sensor configured to measure the intensity of the current flowing from the first probe 11 to the second probe 12.

The processor 100 may determine the position of the first contact point C1 and the second contact point C2 based on the intensity of the current flowing from the first probe 11 to the second probe 12, and accordingly, calculate a distance between the tip of the first probe 11 and the first contact point C1 and a distance between the tip of the second probe 12 and the second contact point C2.

The temperature sensor 140 may be provided near the tip of the first probe 11 and/or the second probe 12 to measure the temperature of the cooking object, and the processor 100 may obtain the temperature information of the cooking object from the temperature sensor 140.

The at least one memory 105 may store a program for performing the above-described operation and the below-described operation, and the at least one processor 100 may execute the program stored in the at least one memory 105.

The at least one memory 105 and the at least one processor 100 may be integrated into one chip or may be physically separated from each other.

The processor 100 may be implemented using various components such as semiconductor chips, switches, integrated circuits, resistors, volatile or nonvolatile memories, or printed circuit boards, and may be implemented using a micro controller unit (MCU).

The memory 105 may be implemented as at least one of storage medium such as a non-volatile memory device such as cache, read only memory (ROM), programmable ROM (PROM), erasable programmable ROM (EPROM), electrically erasable programmable ROM (EEPROM), and flash memory, or a volatile memory device such as random access memory (RAM), or a hard disk drive (HDD) or a CD-ROM. However, the memory is not limited thereto, and any type of memory configured to store various types of information may be used as a type of memory.

The speaker 150 may be provided on the body 10 of the water level detection device 1 and output a warning sound according to a control signal of the processor 100. For example, the speaker 150 may include a buzzer configured to output a warning sound.

The communication circuitry 160 may include a communication module for communicating with an external device. A detailed description of the communication circuitry 160 will be described later with reference to FIGS. 8 and 9.

The user interface 170 may include a display for providing various information to a user, and may include a touch screen configured to provide various information to a user and configured to receive a touch input. The user interface 170 may be provided on the body 10.

Although various components of the water level detection device 1 have been described above, the configuration of the water level detection device 1 may be changed or removed according to embodiments within the scope of the conventional technology. It should be understood that a new configuration may be added to the water level detection device 1 according to embodiments.

Figure 6:
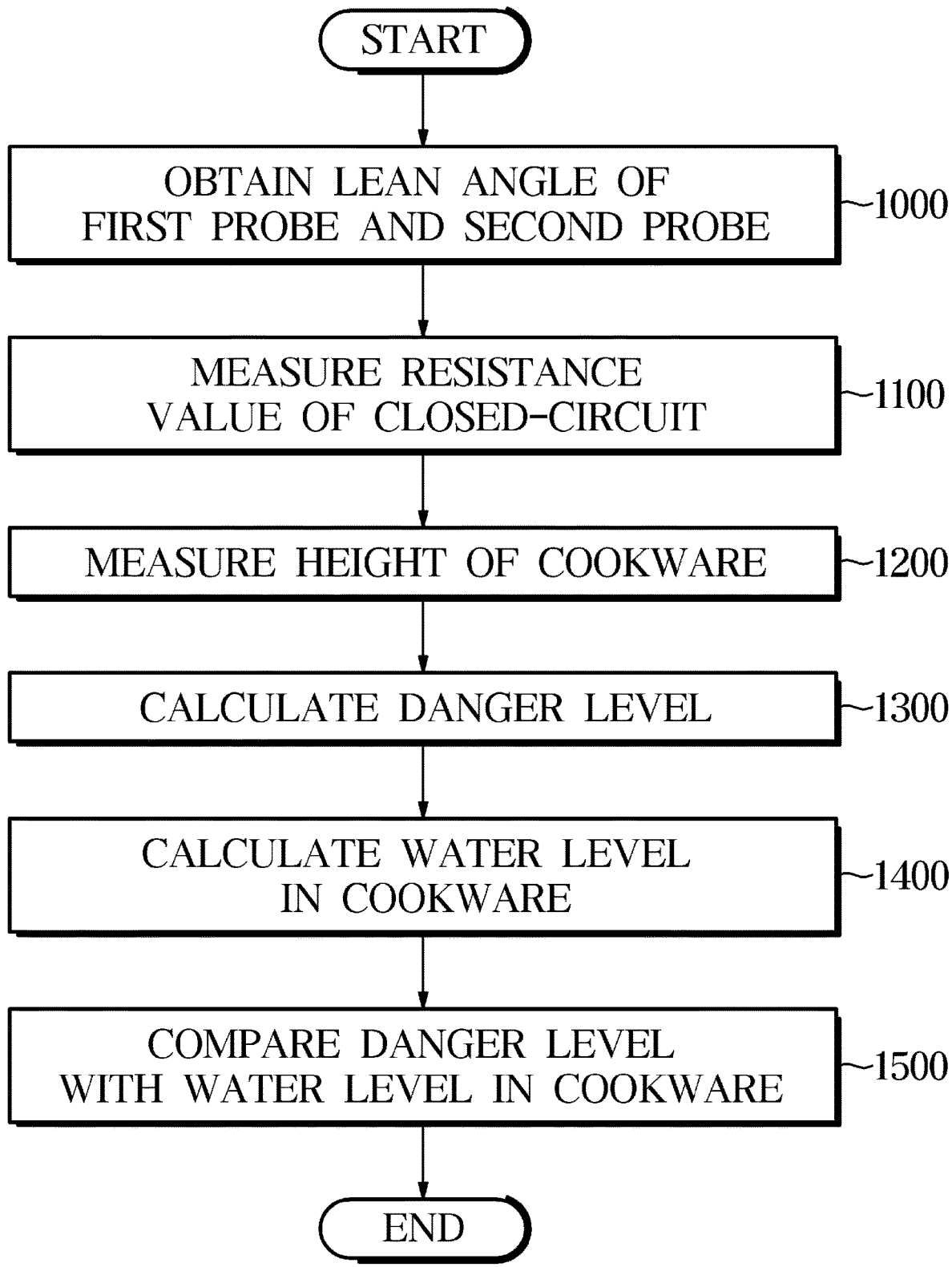
FIG. 6 illustrates a flowchart of a control method of the water level detection device according to one embodiment.
Figure 7:
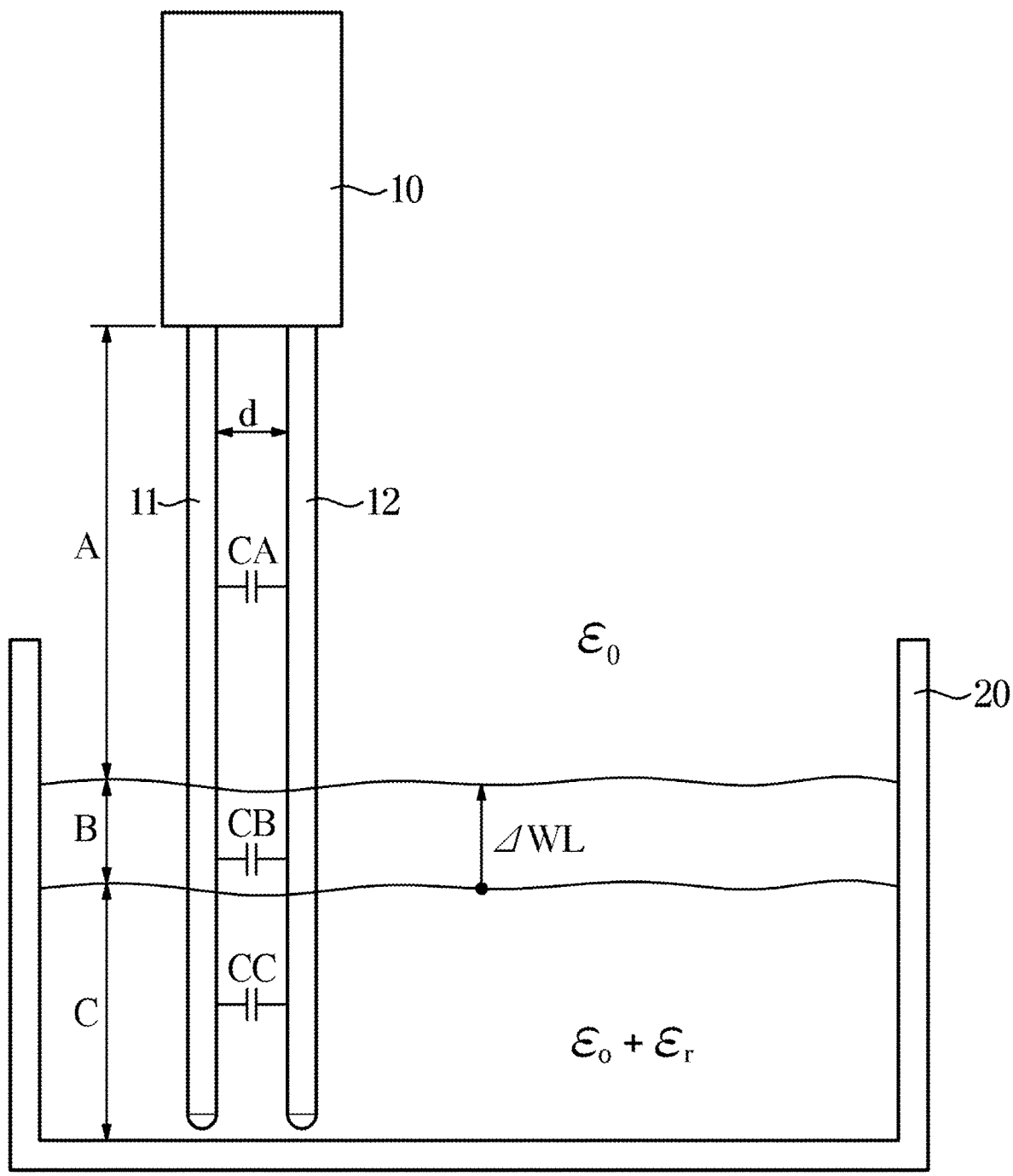
FIG. 7 illustrates a diagram illustrating a change in capacitance according to a change in water level.

FIG. 6 illustrates a flowchart of a control method of the water level detection device according to one embodiment, and FIG. 7 illustrates a diagram illustrating a change in capacitance according to a change in water level.

Referring to FIG. 6, the lean angle sensor 110 of the water level detection device 1 may detect a lean angle of the first probe 11 and the second probe 12, and the processor 100 may obtain information on the lean angle of the first probe 11 and the second probe 12 (1000).

The current sensor 130 may measure an intensity of a current flowing in response to the first probe 11 and the second probe 12 being in contact with the metallic cookware 20, or in response to the first probe 11 and the second probe 12 being electrically connected through the conductive member 14.

The processor 100 may obtain a resistance value of the closed-circuit CL formed through the first contact point C1 and the second contact point C2 based on the current value obtained from the current sensor 130, and accordingly, determine the position of the first contact point C1 and the second contact point C2 (1100).

In other words, the processor 100 may obtain information about the distance between the tip of the first probe 11 and the first contact point C1 and the distance between the tip of the second probe 12 and the second contact point C2.

The processor 100 may calculate a height 20H of the cookware 20 based on the distance value between the tip of the first probe 11 and the first contact point C1 and/or the distance value between the tip of the second probe 12 and the second contact point C2 and the lean angle of the first probe 11 and/or the lean angle of the second probe 12 (1200).

For example, when the lean angle of the first probe 11 is θ and the distance from the tip of the first probe 11 to the first contact point C1 is α, the height 20H of the cookware 20 may be (α*sin(θ)).

The processor 100 may calculate a danger level of the cookware 20 based on the height 20H of the cookware 20 (1300). For example, the processor 100 may calculate the danger level of the cookware 20 by multiplying the height 20H of the cookware 20 by a predetermined weighted value. At this time, the predetermined weighted value may be changed according to the lean angle of the first probe 11 and/or the second probe 12.

For example, when the height of the cookware 20 is calculated as 20 cm, the processor 100 may determine the danger level of the cookware 20 as 18 cm by multiplying 20 cm by a weighted value of 0.9.

In addition, it is estimated that an area of the bottom of the cookware 20 is increased as the lean angle of the first probe 11 and/or the second probe 12 is reduced. Accordingly, the processor 100 may select a weighted value that is proportional to the lean angle of the second probe 12.

The relationship between the lean angle of the first probe 11 and/or the second probe 12 and the weighted value may be stored in the memory 105.

In summary, the processor 100 may calculate the danger level of the cookware 20 based on the intensity of the current flowing from the first probe 11 to the second probe 12 and the lean angle of the first probe 11 and the second probe 12.

Thereafter, the processor 100 may calculate the water level inside the cookware 20 based on the capacitance information obtained from the capacitance sensor 120 (1400).

Referring to FIG. 7, capacitance between the first probe 11 and the second probe 12 may be changed according to a change in water level (AWL) inside the cookware 20.

Particularly, when it is assumed that the distance between the first probe 11 and the second probe 12 is d, the permittivity of water is $(\varepsilon_0+\varepsilon_r)$, and the permittivity of air is $\varepsilon_0$, the capacitance before the water level changes is $\{CA+CB+CC=((\varepsilon_0/d)*(A+B)+((\varepsilon_0+\varepsilon_r)/d)*(C))\}$, and the capacitance after the water level changes is $\{CA'+CB'+CC'=((\varepsilon_0/d)*(A)+((\varepsilon_0+\varepsilon_r)/d)*(B+C))\}$.

That is, the amount of change in capacitance according to the change in water level (ΔWL) is $\Delta CB=((\varepsilon_r/d)*B)$.

The memory 105 may store information on the permittivity of water, the permittivity of water according to temperature, and the permittivity of air, and the processor 100 may calculate the water level inside the cookware 20 based on the difference in capacitance.

The processor 100 may more accurately determine the water level inside the cookware 20 by applying the permittivity of water according to the temperature based on the temperature of the cooking object measured by the temperature sensor 140.

The processor 100 may compare the danger level inside the cookware 20 with the water level inside the cookware 20 to determine whether the water level inside the cookware 20 reaches the danger level (1500).

When the first probe 11 and the second probe 12 are tilted, the water level inside the cookware 20 may be measured differently from the actual water level inside the cookware 20 according to the lean angle.

Accordingly, the processor 100 may compare a value, which is calculated by multiplying the danger level calculated in the previous operation 1300 by the value of csc(θ), with a water level inside the cookware calculated based on the capacitance.

Further, the processor 100 may determine whether the water level inside the cookware 20 reaches the danger level, in response to a temperature value measured by the temperature sensor 140 being greater than or equal to a predetermined value. At this time, the predetermined value may be set to a value about the boiling point of water and stored in the memory 105.

This is because, even if the water level inside the cookware 20 reaches the danger level, there is no risk of water boiling over when the temperature of the cooking object is below the boiling point of water.

Although not shown in the drawings, the processor 100 may control the speaker 150 to output a warning sound when the water level inside the cookware 20 reaches the danger level. Accordingly, a user who hears the warning sound can prevent the water from overflowing by directly controlling the cooking apparatus 2 that heats the cookware 20.

The water level detection device 1 according to one embodiment may efficiently determine whether or not the bumping phenomenon occurs inside the cookware 20 by calculating an appropriate danger level according to the size and height of the cookware 20.

Hereinafter various processes in which the water level detection device 1 according to one embodiment warns a user when the water level inside the cookware 20 reaches the danger level will be described.

Figure 8:
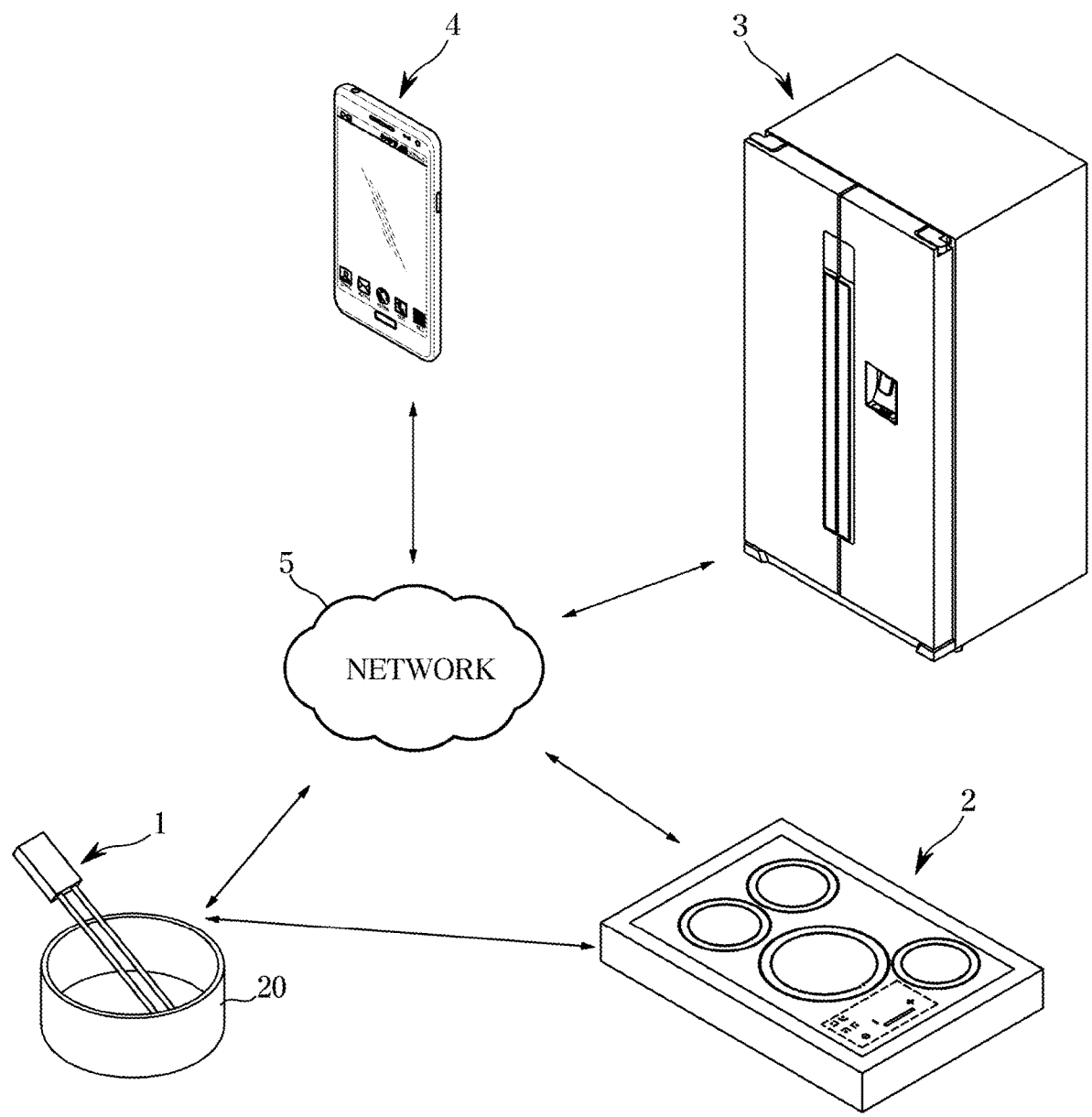
FIG. 8 illustrates a communication system of the water level detection device according to one embodiment.
Figure 9:
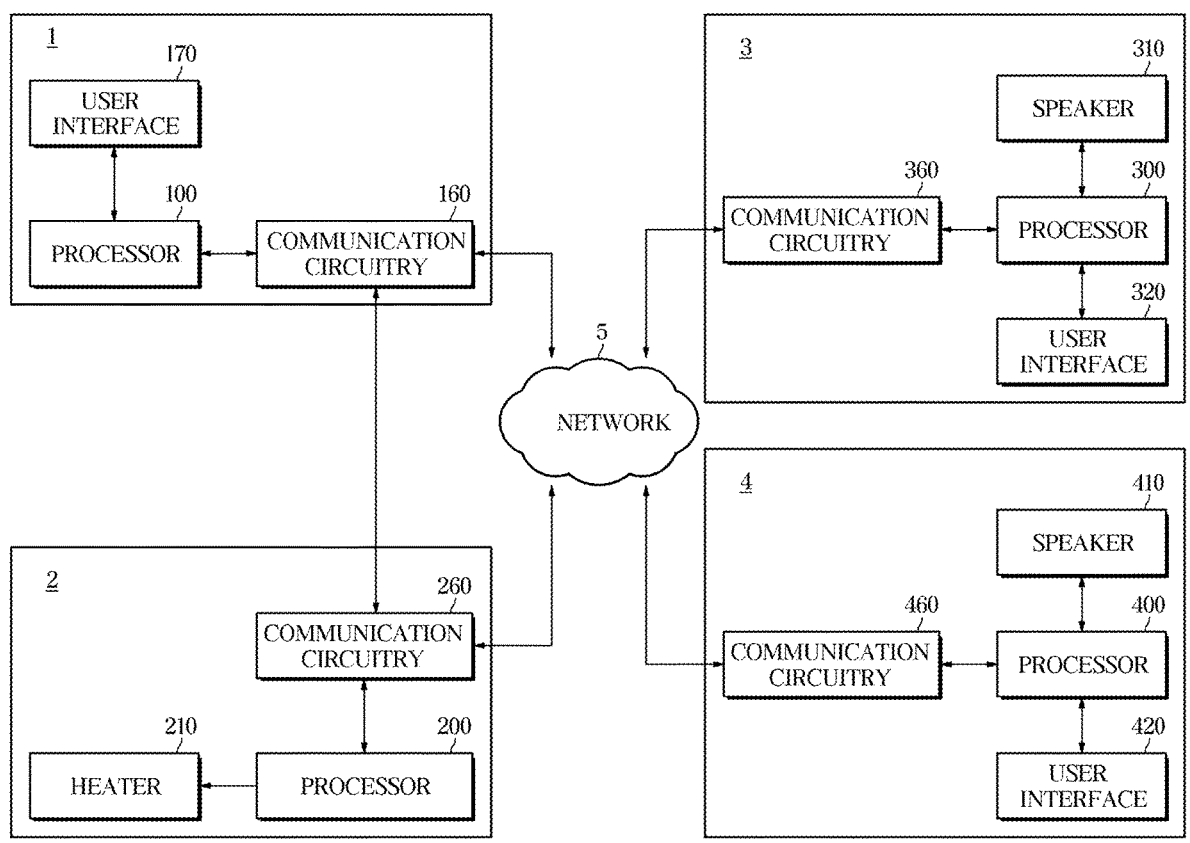
FIG. 9 illustrates a control block diagram of the communication system of the water level detection device according to one embodiment.

FIG. 8 illustrates a communication system of the water level detection device according to one embodiment, and FIG. 9 illustrates a control block diagram of the communication system of the water level detection device according to one embodiment.

Referring to FIGS. 8 and 9, the communication system of the water level detection device may include the water level detection device 1, the cooking apparatus 2, a home appliance 3, and a mobile terminal device 4.

The cooking apparatus 2 may include any appliance that heats the cookware 20, such as a gas stove and/or a radiant cooktop and/or an induction cooker.

The home appliance 3 may include all home appliances such as a television, an air conditioner, an air purifier, a refrigerator, a washing machine, a clothes dryer, and a clothes care apparatus. However, the embodiment of the home appliance 3 is not limited thereto, and any home appliance including a user interface 320 and configured to access a server through a communication device may be the home appliance 3 according to one embodiment.

Although shown separately in the drawing, the cooking apparatus 2 according to the embodiment may be included as a part of the home appliance 3.

The mobile terminal device 4 may mean any device including a user interface 420 and configured to access a server through a communication device, and thus the mobile terminal device 4 may include a user's smart phone.

Through a network 5, the water level detection device 1 according to one embodiment may transmit and receive various types of data and information with the cooking apparatus 2, which heats the cookware 20, and/or the home appliance 3 and/or the mobile terminal device 4.

Through a server (not shown), the water level detection device 1 may indirectly transmit and receive various types of data and information with the cooking apparatus 2 and/or the home appliance 3 and/or the mobile terminal device 4. Alternatively, the water level detection device 1 may directly transmit and receive various types of data and information with the cooking apparatus 2 and/or the home appliance 3 and/or the mobile terminal device 4.

The network 5 may mean a wireless communication network, and may include at least one of a telecommunication network such as a computer network (e.g., LAN or WAN), the Internet, or a telephone network.

The network 5 may be provided to the cooking apparatus 2 and/or home appliance 3 and/or the mobile terminal device 4 through an access point (AP).

The water level detection device 1 may be directly connected to the cooking apparatus 2 according to embodiments and perform direct communication without through the network 5.

For this, the communication circuitry 160 of the water level detection device 1 may include one or more communication modules that transmit and receive data according to predetermined communication rules. For example, the communication circuitry 160 may include a wireless communication module and/or a short-range communication module.

Wireless communication modules may include at least one of various wireless communication modules connected to the Internet network using a wireless communication method such as Global System for Mobile Communication (GSM), CodeDivision Multiple Access (CDMA), Wideband Code Division Multiple Access (WCDMA), Universal Mobile Telecommunications System (UMTS), Time Division Multiple Access (TDMA), Long Term Evolution (LTE), 4th generation mobile communication, and 5th generation mobile communication as well as Wi-Fi and Wireless broadband (WiBro).

The short-range communication module may include at least one of various short-range communication modules that transmit and receive signals using a wireless communication network at a short distance such as a Bluetooth module, an infrared communication module, a Radio Frequency Identification (RFID) communication module, a Wireless Local Access Network (WLAN) communication module, an NFC communication module, a Zigbee communication module, and a Z-Wave communication module, and Wi-Fi direct communication module.

In addition, the communication circuitry 160 may include an antenna configured to transmit a radio signal into a free space or receive a radio signal from a free space, and a modulator/demodulator configured to modulate data to be transmitted or configured to demodulate a received radio signal.

Similarly, a communication circuitry 260 of the cooking apparatus 2, a communication circuitry 360 of the home appliance 3, and a communication circuitry 460 of the mobile terminal device 4 may also include the aforementioned wireless communication module and/or short-range communication module.

According to embodiments, the communication circuitry 260 of the cooking apparatus 2 may include only a short-distance communication module. In this case, the communication circuitry 160 of the water level detection device 1 and the communication circuitry 260 of the cooking apparatus 2 may perform short-range communication.

For example, the communication circuitry 160 of the water level detection device 1 and the communication circuitry 260 of the cooking apparatus 2 may transmit and receive various data by performing Bluetooth communication.

In addition, although not shown in the drawing, the home appliance 3 and the mobile terminal device 4 may also perform short-range communication to transmit and receive various data with the water level detection device 1 and/or the cooking apparatus 2.

The processor 100 of the water level detection device 1 according to one embodiment may control the communication circuitry 160 to transmit and receive various data and/or information to and from various external devices 2, 3, and 4.

The cooking apparatus 2 may include a processor 200 configured to control a heater 210 based on information and/or data received from the communication circuitry 260.

The heater 210 may include a component configured to heat the cookware 20 and a driving circuit configured to drive the component configured to heat the cookware 20.

For example, when it is assumed that the cooking apparatus 2 is an induction cooker, the heater 210 may include a coil configured to generate a magnetic field and a driving circuit configured to drive the coil. As another example, when it is assumed that the cooking apparatus 2 is a radiant cooktop, the heater 210 may include a hot wire configured to generate heat and a driving circuit configured to drive the hot wire.

The home appliance 3 may include a processor 300 configured to control a speaker 310 and/or the user interface 320 based on information and/or data received from the communication circuitry 360.

In addition, the processor 300 of the home appliance 3 may control the communication circuitry 360 to transmit a control signal for controlling the cooking apparatus 2 based on the user input received from the user interface 320.

Similarly, the mobile terminal device 4 may include a processor 400 configured to control a speaker 410 and/or the user interface 420 based on information and/or data received from the communication circuitry 460.

Further, the processor 400 of the mobile terminal device 4 may control the communication circuitry 460 to transmit a control signal for controlling the cooking apparatus 2 based on a user input received from the user interface 420.

The user interfaces 320 and 420 may include a display provided to provide various information to the user, and may include a touch screen provided to provide various information to the user and receive a touch input from a user.

In the above, each configuration of the communication system of the water level detection device 1 according to one embodiment has been described.

Hereinafter a control method of the water level detection device 1 using each configuration of the communication system of the water level detection device 1 will be described with reference to FIGS. 10 to 15.

Figure 10:
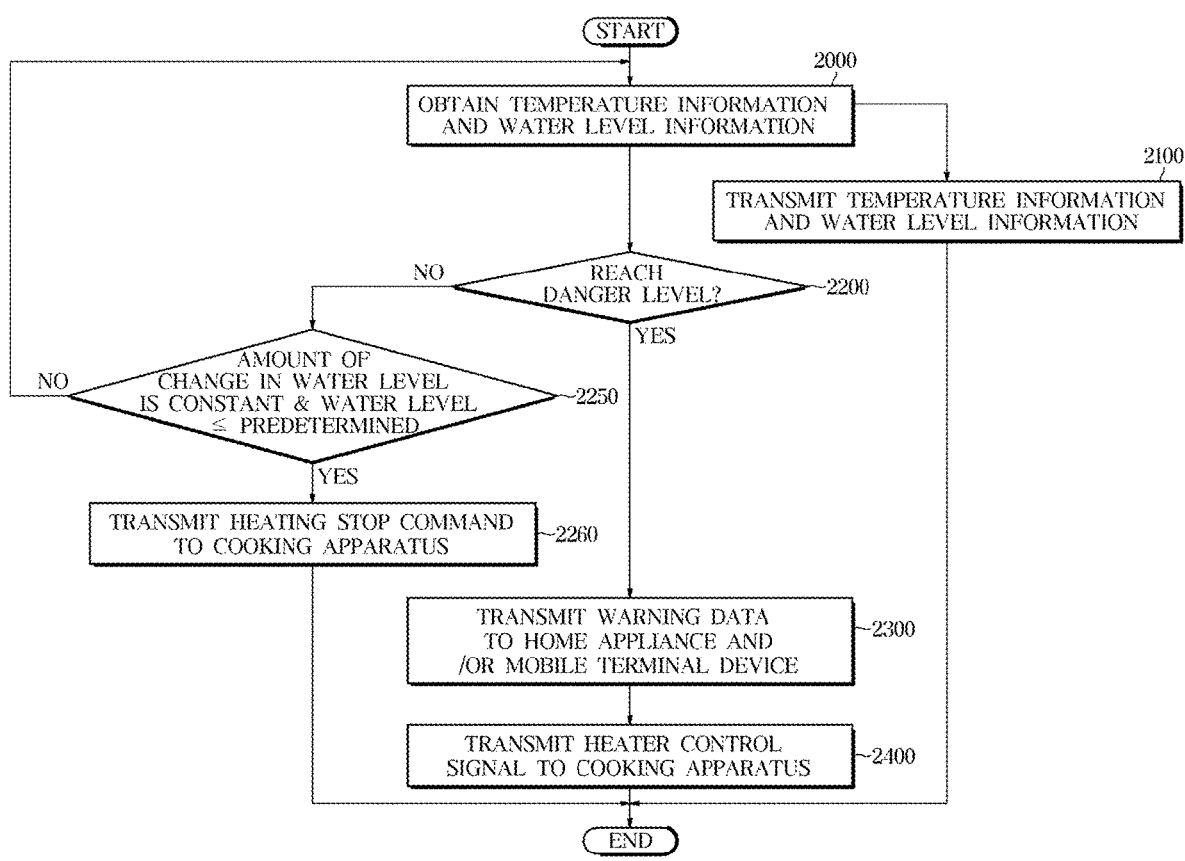
FIG. 10 illustrates a flowchart of a control method of a water level detection device according to another embodiment.
Figure 11:
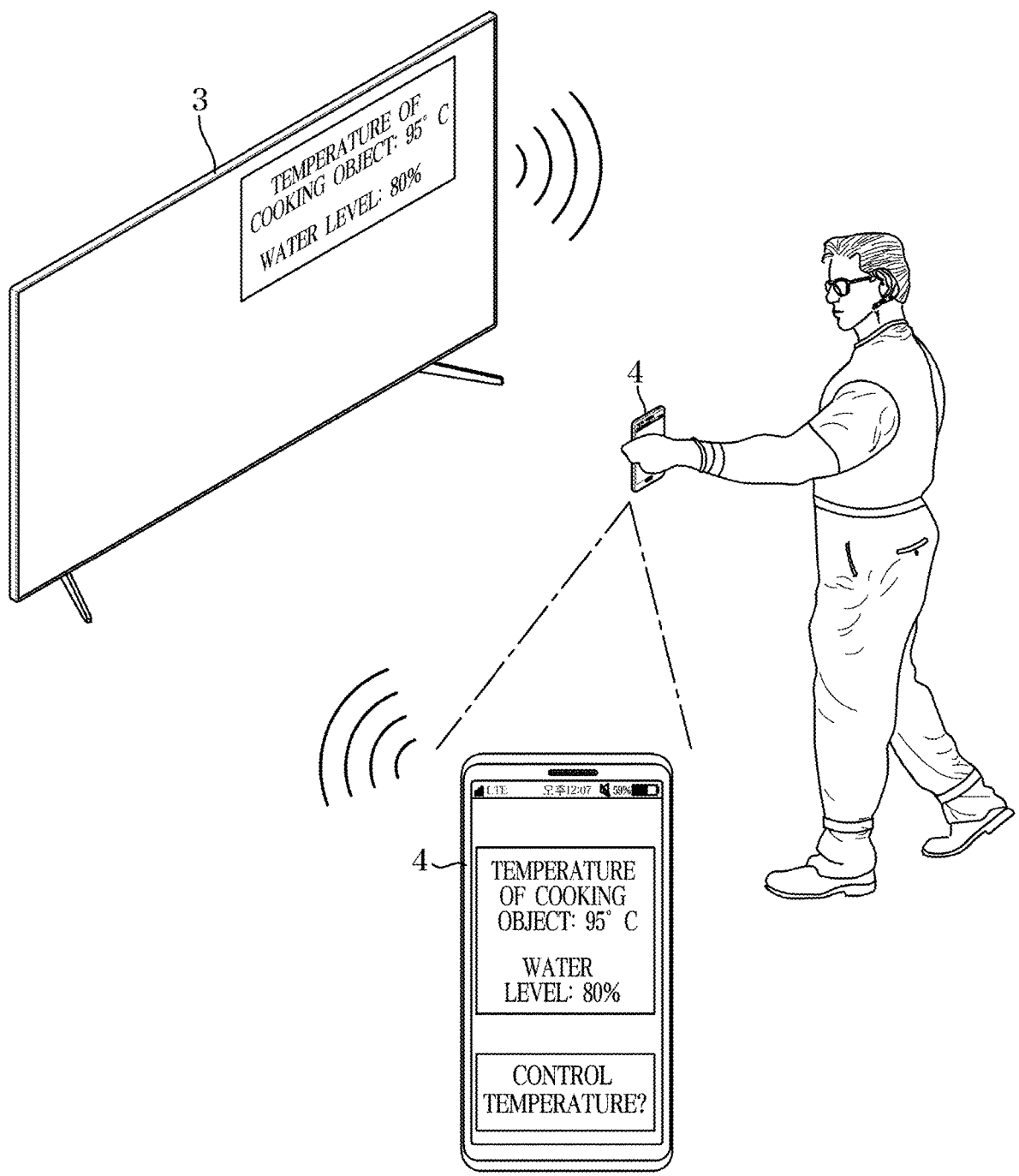
FIG. 11 illustrates a state in which the water level detection device according to one embodiment transmits temperature information and water level information to a home appliance and a mobile terminal device.
Figure 12:
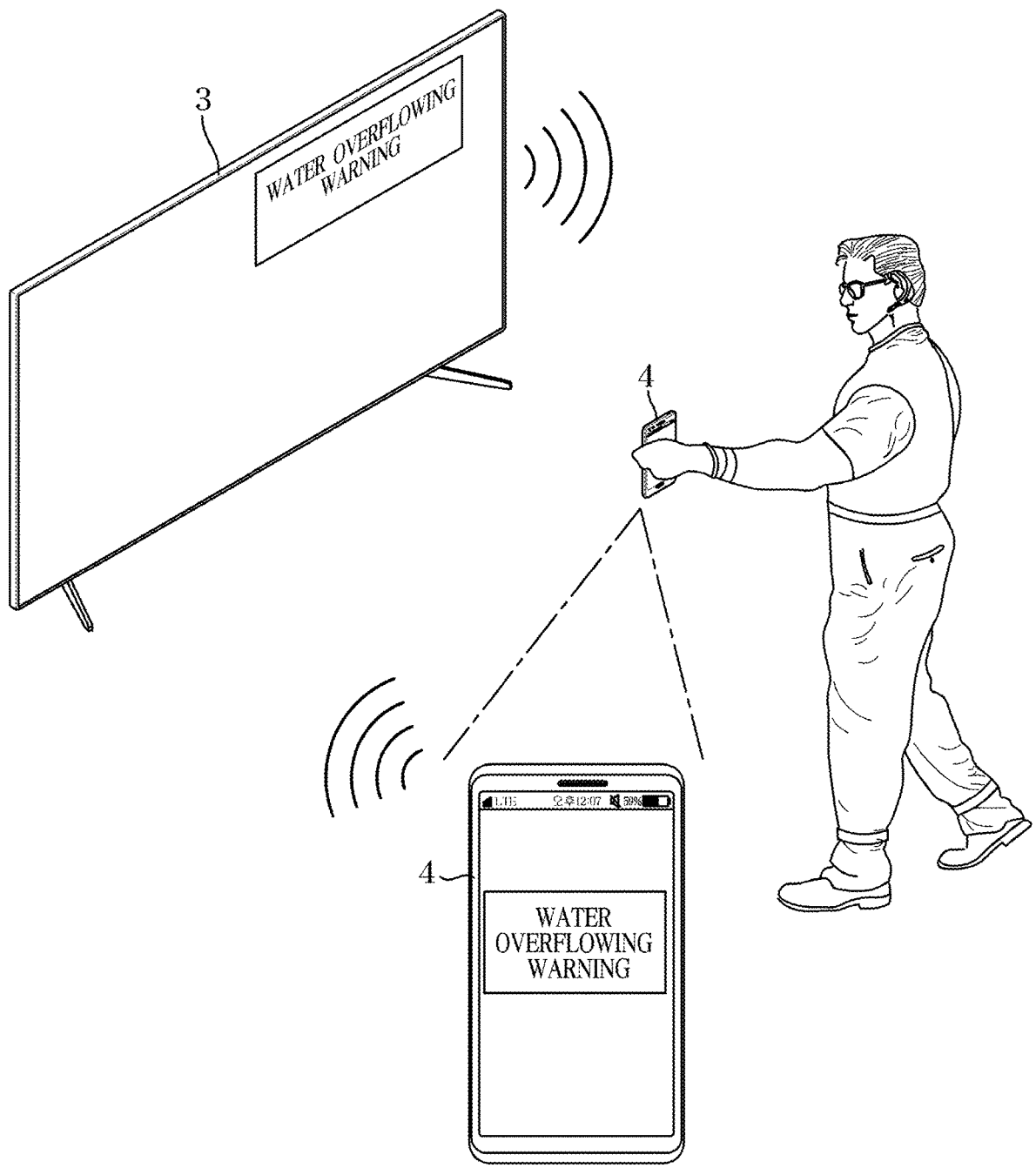
FIG. 12 illustrates a state in which the water level detection device according to one embodiment transmits warning data to the home appliance and the mobile terminal device.
Figure 13:
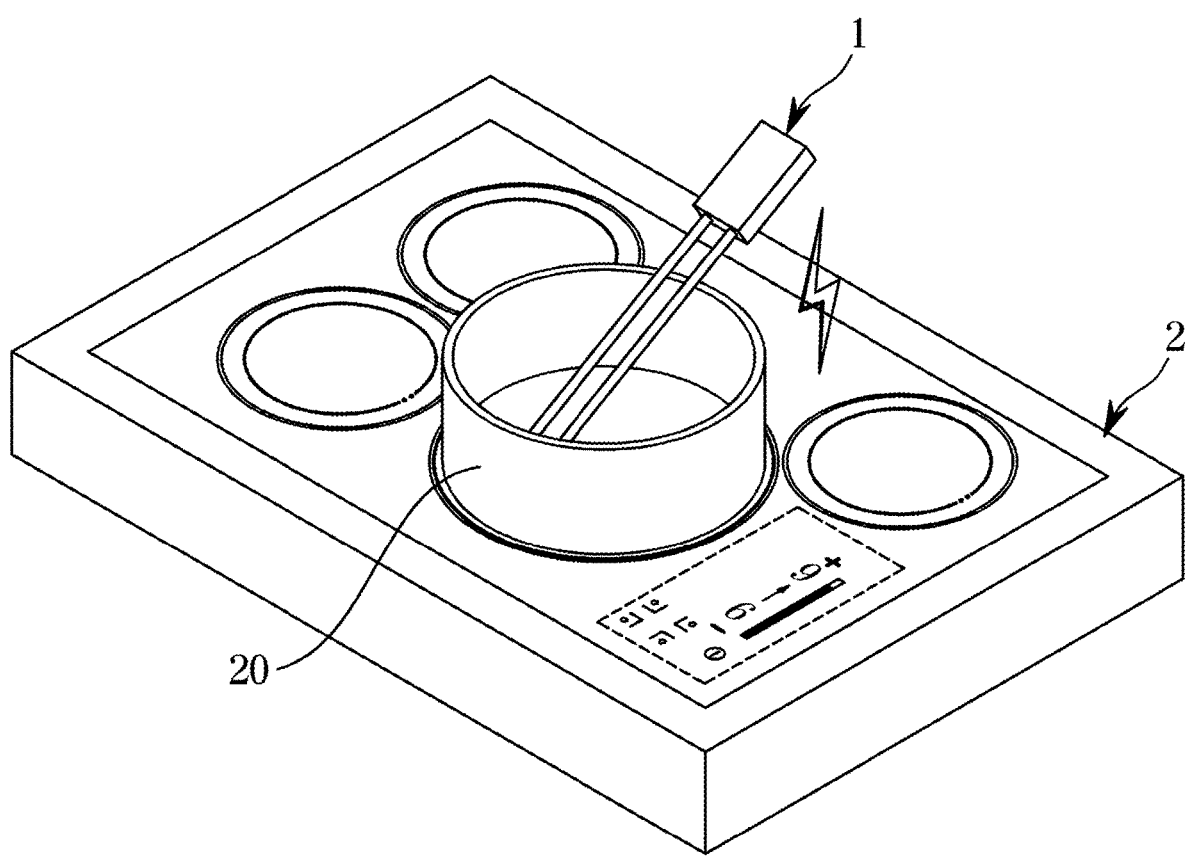
FIG. 13 illustrates a state in which the water level detection device according to one embodiment adjusts a heat intensity of a cooking apparatus.
Figure 14:
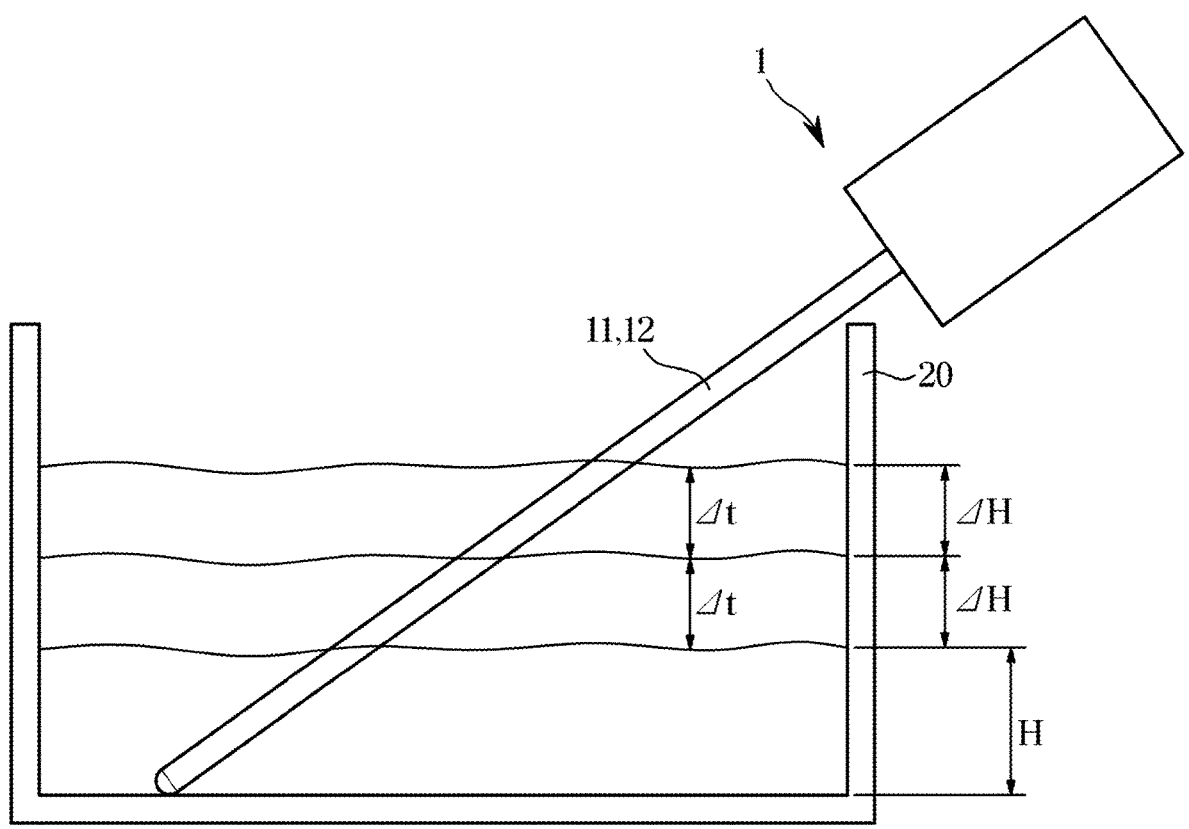
FIG. 14 illustrates a state in which the water level detection device according to one embodiment stops a heating operation of the cooking apparatus.
Figure 15:
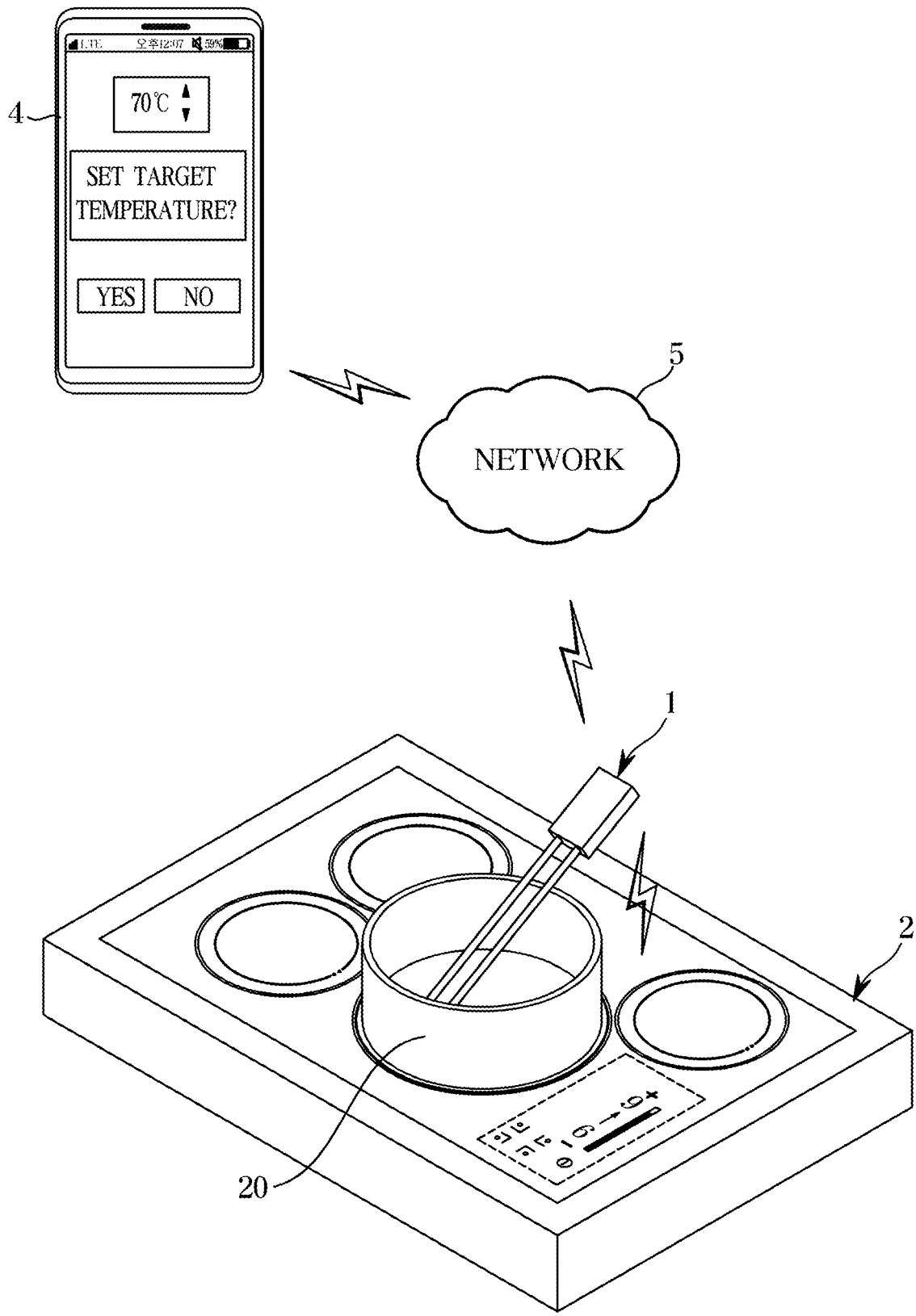
FIG. 15 illustrates a state in which the water level detection device according to one embodiment transfers a command received from the mobile terminal device to the cooking apparatus.

FIG. 10 illustrates a flowchart of a control method of a water level detection device according to another embodiment, FIG. 11 illustrates a state in which the water level detection device according to one embodiment transmits temperature information and water level information to a home appliance and a mobile terminal device, FIG. 12 illustrates a state in which the water level detection device according to one embodiment transmits warning data to the home appliance and the mobile terminal device, FIG. 13 illustrates a state in which the water level detection device according to one embodiment adjusts a heat intensity of a cooking apparatus, FIG. 14 illustrates a state in which the water level detection device according to one embodiment stops a heating operation of the cooking apparatus, and FIG. 15 illustrates a state in which the water level detection device according to one embodiment transfers a command received from the mobile terminal device to the cooking apparatus.

Referring to FIG. 10, as described above, the processor 100 may obtain temperature information and water level information of a cooking object (2000). In this case, the temperature information may be obtained from the temperature sensor 140, and the water level information may be obtained from sensors such as the lean angle sensor 110, the capacitance sensor 120, and the current sensor 130.

The water level information may include information about the water level inside the cookware 20 and information about the danger level.

The processor 100 may control the communication circuitry 160 so as to transmit information about the water level inside the cookware 20 and information about the temperature value obtained from the temperature sensor 140 to the home appliance 3 or the mobile terminal device 4 (2100). In this case, the home appliance 3 may include the cooking apparatus 2.

Referring to FIG. 11, the home appliance 3 and/or the mobile terminal device 4 receiving the information on the temperature value of the cooking object and the information on the water level inside the cookware 20 from the water level detection device 1 may control each of the user interfaces 320 and 420 so as to display the temperature of the cooking object and the water level inside the cookware 20.

In addition, in response to receiving the information about the temperature of the cooking object and the information about the water level inside the cookware 20, the processor 400 of the mobile terminal device 4 may output a message asking a user to control the temperature of the cooking object.

In this case, the water level inside the cookware 20 may be displayed as a ratio of the water level to the height of the cookware 20, and thus a user can intuitively check the water level inside the cookware 20.

The water level detection device 1 may transmit temperature information and water level information to the home appliance 3 and/or the mobile terminal device 4 only when specific conditions are satisfied according to user settings input from the user interface 170.

For example, in a state in which a user sets the user interface 170 to receive a notification based on the temperature of the cooking object reaching 95° C., the processor 100 may control the communication circuitry 160 to transmit information about the temperature value of the cooking object and/or information about the water level inside the cookware 20 to the home appliance 3 and/or the mobile terminal device 4 in response to a temperature value, which is obtained from the temperature sensor 140, reaching 95° C.

As another example, in a state in which a user sets the user interface 170 to receive a notification based on the water level inside the cookware 20 reaching 80%, the processor 100 may control the communication circuitry 160 to transmit information about the temperature value of the cooking object and/or information about the water level inside the cookware 20 to the home appliance 3 and/or the mobile terminal device 4 in response to the water level inside the cookware 20 reaching 80%.

As another example, a user can set conditions for receiving temperature information and/or water level information through the user interface 320 of the home appliance 3 or the user interface 420 of the mobile terminal device 4.

In response to the water level inside the cookware 20 reaching the danger level (yes in 2200), the processor 100 may control the communication circuitry 160 to transmit warning data to the home appliance 3 and/or the mobile terminal device 4 (2300).

The warning data may include data indicating that the water level in the cookware 20 reaches the danger level and/or a warning signal for outputting a warning alarm that warns the reaching of the danger level.

Referring to FIG. 12, the home appliance 3 receiving the warning data from the water level detection device 1 may control the user interface 320 to output a warning message of "water overflow warning", and control the speaker 310 to output a warning sound In addition, the mobile terminal device 4 receiving the warning data from the water level detection device 1 may control the user interface 420 to output a warning message of "water overflow warning", and control the speaker 410 to output a warning sound. The type and form of the warning sound and the type and form of the warning message may be variously adopted.

When the warning message or warning sound is output from the home appliance 3 and/or the mobile terminal device 4, a user can directly adjust a heat intensity of the cooking apparatus 2 to prevent water overflow.

In addition, in response to the water level inside the cookware 20 reaching the danger level (yes in 2200), the processor 100 may control the communication circuitry 160 to transmit a command for reducing the heat intensity of the cooking apparatus 2 that heats the cookware 20 (2400).

The processor 100 may determine an adjustment degree of the heat intensity based on the temperature information and the water level information obtained from the temperature sensor 140.

In this case, the communication circuitry 160 of the water level detection device 1 may transmit a command to the communication circuitry 260 of the cooking apparatus 2 through the short-range communication module.

Referring to FIG. 13, because the water level detection device 1 is always located to be close to the cooking apparatus 2, the water level detection device 1 may perform the short-range communication with the cooking apparatus 2.

Accordingly, the cooking apparatus 2 may receive a control signal by performing the short-range communication without the wireless communication module.

The processor 200 of the cooking apparatus 2 receiving the command to reduce the heat intensity may control the heater 210 to reduce the heat intensity.

Even when the water level inside the cookware 20 does not reach the danger level (no in 2200), the processor 100 may control the communication circuitry 160 to transmit a heating stop command to the cooking apparatus 2 under a specific condition.

Particularly, in response to expiration of a predetermined period of time in a state in which an amount of change in the water level inside the cookware 20 per unit time is constant, and in response to the water level inside the cookware 20 being less than or equal to the predetermined water level (yes in 2250), the processor 100 may control the communication circuitry 160 to transmit the command, which stops the heating operation of the cooking apparatus 2, to the cooking apparatus 2 (2260).

The processor 200 of the cooking apparatus 2 may stop the operation of the heater 210 based on the command received from the communication circuitry 260.

Referring to FIG. 14, it can be seen that the predetermined period of time elapses in the state in which the water level (ΔH) inside the cookware 20 per unit time (Δt) is constant, and the water level inside the cookware 20 is less than or equal to the predetermined water level H.

A state, in which the water inside the cookware 20 is heated and evaporates and the water level inside the cookware 20 decreases at a certain rate, may be assumed as a situation in which a user forgets that cooking is in progress and forgets stopping the operation of the cooking apparatus 2. Accordingly, in order to prevent a risk of fire, the water level detection device 1 may control the communication circuitry 160 to transmit a control signal for stopping the heater 210 of the cooking apparatus 2.

The predetermined water level H may be stored in the memory 105 as a water level of about 10%, but is not limited thereto. For example, the predetermined water level H may be set by a user through the user interface 170.

In addition, in response to expiration of a threshold time in the state in which the water level (ΔH) inside the cookware 20 per unit time (Δt) is constant, the processor 100 may control the communication circuitry 160 to transmit the command, which stops the heater 210 of the cooking apparatus 2, regardless of the water level in the cookware 20.

The threshold time of about 10 hours may be stored in the memory 105, but is not limited thereto. For example, the threshold time may be set by a user through the user interface 170.

In the above-description, it has been described that the heat intensity of the cooking apparatus 2 is controlled by the water level detection device 1, but a subject that controls the heat intensity of the cooking apparatus 2 is not limited to the water level detection device 1.

For example, when the water level detection device 1 transmits the temperature information and water level information to the cooking apparatus 2, the processor 200 of the cooking apparatus 2 may automatically control the heater 210 based on the temperature information and water level information obtained from the water level detection device 1 through the communication circuitry 260.

As another example, the home appliance 3 and/or the mobile terminal device 4 may transmit a command that controls the heat intensity of the cooking apparatus 2 to the cooking apparatus 2 through the network 5 based on a target temperature that is input from a user through the user interfaces 320 and 420 and the temperature information and water level information received from the water level detection device 1.

Referring to FIG. 15, when the communication circuitry 260 of the cooking apparatus 2 includes the short-range communication module and does not include the wireless communication module, the home appliance 3 and/or the mobile terminal device 4 may transmit the target temperature, which is input from a user through the user interfaces 320 and 420, to the water level detection device 1.

The water level detection device 1 receiving the target temperature may transmit a control signal for controlling the heating operation of the cooking apparatus 2 by performing the short-range communication with the cooking apparatus 2.

That is, when the water level detection device 1 receives a temperature control command from the mobile terminal device 4 and/or the home appliance 3 through the wireless communication module, the water level detection device 1 may control the short-range communication module to transmit the command for adjusting the heat intensity of the cooking apparatus 2, based on the temperature value measured from the temperature sensor 140 and the temperature control command.

In addition, the water level detection device 1 may transmit only the target temperature information received from the mobile terminal device 4 and/or the home appliance 3 and the temperature information of the cooking object obtained from the temperature sensor 140 to the cooking apparatus 2. The processor 200 of the cooking apparatus 2 may control the heater 210 based on the target temperature information and the temperature information of the cooking object.

According to the above embodiment, even when the cooking apparatus 2 does not include the wireless communication module, the cooking apparatus 2 may indirectly receive the control command, which is through the wireless communication module, through the water level detection device 1.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although the present disclosure has been described with various embodiments, various changes and modifications may be suggested to one skilled in the art. It is intended that the present disclosure encompass such changes and modifications as fall within the scope of the appended claims.

What is claimed is:

1. A water level detection device configured to detect a water level inside a cookware, the water level detection device comprising:

a first probe;
a second probe;
a lean angle sensor configured to detect a lean angle of the first probe and the second probe;
a capacitance sensor configured to detect capacitance between the first probe and the second probe; and
a processor configured to:
  calculate a danger level of the cookware based on an intensity of a current flowing from the first probe to the second probe and the lean angle of the first probe and the second probe; and
  determine whether the water level inside the cookware reaches the danger level based on the capacitance between the first probe and the second probe.

2. The water level detection device of claim 1, wherein:
the current flowing from the first probe to the second probe is a current in a closed circuit formed by a first contact point between the first probe and the cookware and a second contact point between the second probe and the cookware, and
the processor is configured to:
  determine a position of the first contact point and the second contact point based on a current value flowing in the closed circuit;
  calculate a height of the cookware based on the position of the first contact point and the second contact point, and the lean angle of the first probe and the second probe; and
  calculate the danger level of the cookware based on the height of the cookware.

3. The water level detection device of claim 1, further comprising:
a temperature sensor provided on the first probe or the second probe and configured to measure a temperature value,
wherein the processor is configured to determine whether the water level inside the cookware reaches the danger level, in response to measuring a temperature value greater than or equal to a predetermined value.

4. The water level detection device of claim 1, further comprising:
a speaker,
wherein the processor is configured to control the speaker to output a warning sound in response to the water level inside the cookware reaching the danger level.

5. The water level detection device of claim 1, further comprising:
a communication circuitry configured to communicate with a home appliance or a mobile terminal device,
wherein the processor is configured to control the communication circuitry to transmit warning data to the home appliance or the mobile terminal device in response to the water level inside the cookware reaching the danger level.

6. The water level detection device of claim 1, further comprising:
a temperature sensor provided on the first probe or the second probe; and
a communication circuitry configured to communicate with a home appliance or a mobile terminal device,
wherein the processor is configured to control the communication circuitry to transmit information on the water level inside the cookware and information on a temperature value obtained from the temperature sensor to the home appliance or the mobile terminal device.

7. The water level detection device of claim 1, further comprising:
a communication circuitry configured to communicate with a cooking apparatus configured to heat the cookware,
wherein the processor is configured to control the communication circuitry to transmit, to the cooking apparatus, a command for reducing a heat intensity of the cooking apparatus in response to the water level inside the cookware reaching the danger level.

8. The water level detection device of claim 1, further comprising:
a communication circuitry configured to communicate with a cooking apparatus configured to heat the cookware,
wherein the processor is configured to control the communication circuitry to transmit, to the cooking apparatus, a command for stopping a heating operation of the cooking apparatus in response to an amount of change in the water level inside the cookware per unit time being constant and in response to the water level inside the cookware being less than or equal to a predetermined water level.

9. The water level detection device of claim 1, further comprising:
a communication circuitry comprising a first communication module configured to communicate with a mobile terminal device and a second communication module configured to communicate with a cooking apparatus configured to heat the cookware; and
a temperature sensor provided on the first probe or the second probe,
wherein in response to receiving a temperature control command from the mobile terminal device through the first communication module, the processor is configured to control the second communication module to transmit, to the cooking apparatus, a command for adjusting a heat intensity of the cooking apparatus based on a temperature value measured by the temperature sensor and the temperature control command.

10. The water level detection device of claim 1, further comprising:
a conductive member configured to:
  move in a direction parallel to the first probe and the second probe, and
  electrically connect the first probe and the second probe.

11. A control method of a water level detection device comprising a first probe and a second probe and configured to detect a water level inside a cookware, the control method comprising:
calculating a danger level of the cookware based on an intensity of a current flowing from the first probe to the second probe and a lean angle of the first probe and the second probe; and
determining whether the water level inside the cookware reaches the danger level based on capacitance between the first probe and the second probe.

12. The control method of claim 11, wherein:
the current flowing from the first probe to the second probe is a current in a closed circuit formed by a first contact point between the first probe and the cookware, and a second contact point between the second probe and the cookware, and
wherein the calculating of the danger level of the cookware comprises:

determining a position of the first contact point and the second contact point based on a current value flowing in the closed circuit;

calculating a height of the cookware based on the position of the first contact point and the second contact point and the lean angle of the first probe and the second probe; and calculating the danger level of the cookware based on the height of the cookware.

13. The control method of claim 11, wherein the determination of whether the water level inside the cookware reaches the danger level comprises determining whether the water level inside the cookware reaches the danger level, in response to measuring a temperature value, which is measured by a temperature sensor arranged in the first probe or the second probe, greater than or equal to a predetermined value.

14. The control method of claim 11, further comprising:
controlling a speaker to output a warning sound in response to the water level inside the cookware reaching the danger level.

15. The control method of claim 11, further comprising:
transmitting warning data to a home appliance or a mobile terminal device in response to the water level inside the cookware reaching the danger level.

16. The control method of claim 11, further comprising:
transmitting information on the water level inside the cookware and information on a temperature value obtained from a temperature sensor, provided on the first probe or the second probe, to a home appliance or a mobile terminal device.

17. The control method of claim 11, further comprising:
transmitting, to a cooking apparatus, a command for reducing a heat intensity of the cooking apparatus in response to the water level inside the cookware reaching the danger level.

18. The control method of claim 11, further comprising:
transmitting, to a cooking apparatus, a command for stopping a heating operation of the cooking apparatus in response to an amount of change in the water level inside the cookware per unit time being constant and in response to the water level inside the cookware being less than or equal to a predetermined water level.

19. The control method of claim 11, further comprising:
in response to receiving a temperature control command from a mobile terminal device through a first communication module, controlling a second communication module to transmit, to a cooking apparatus, a command for adjusting a heat intensity of the cooking apparatus based on a temperature value measured by a temperature sensor provided on the first probe or the second probe and the temperature control command.

20. The control method of claim 11, further comprising:
electrically connecting the first probe and the second probe using a conductive member configured to move in a direction parallel to the first probe and the second probe.

* * * * *